(12) United States Patent
Bakos et al.

(10) Patent No.: US 7,703,411 B1
(45) Date of Patent: Apr. 27, 2010

(54) VIBRATIONAL EXCITED FRAME FOOD COATING APPARATUS AND METHODS OF USE THEREOF

(75) Inventors: James Bakos, Poynette, WI (US); James Karpinsky, Poynette, WI (US); Scott Rose, Columbus, WI (US); Travis Renkly, DeForest, WI (US)

(73) Assignee: Vibratory Solutions, LLC, Lodi, WI (US)

( * ) Notice: Subject to any disclaimer, the term of this patent is extended or adjusted under 35 U.S.C. 154(b) by 946 days.

(21) Appl. No.: 11/396,202

(22) Filed: Mar. 30, 2006

Related U.S. Application Data

(60) Provisional application No. 60/667,405, filed on Apr. 1, 2005.

(51) Int. Cl.
*B05C 3/00* (2006.01)
(52) U.S. Cl. .............................. 118/22; 118/24; 99/494; 99/450.1; 198/766
(58) Field of Classification Search .................. 118/22, 118/24; 99/494, 450.1; 198/766; 209/920, 209/314, 354
See application file for complete search history.

(56) References Cited

U.S. PATENT DOCUMENTS

| | | | |
|---|---|---|---|
| 580,644 | A | 4/1897 | Ham |
| 2,659,338 | A | 11/1953 | Harrison |
| 3,245,518 | A | 4/1966 | Reibel et al. |
| 3,707,769 | A | 1/1973 | Syrjanen et al. |
| 4,248,173 | A | 2/1981 | Kuhlman |
| 4,313,535 | A | 2/1982 | Carmichael |
| 4,889,241 | A | 12/1989 | Cogan et al. |
| 4,936,248 | A | 6/1990 | Miller |
| 5,052,330 | A | 10/1991 | Stacy |
| 5,150,798 | A | 9/1992 | Mills, Jr. |
| 5,238,303 | A | 8/1993 | Dixon |
| 5,238,493 | A | 8/1993 | Miller |
| 5,267,672 | A | 12/1993 | Jacobsen et al. |

(Continued)

OTHER PUBLICATIONS

MP Equipment Company, Brochure, "MP Drum Breader"; http://www.mpequipment.com/products/breader_drum.html.

(Continued)

*Primary Examiner*—Laura Edwards
(74) *Attorney, Agent, or Firm*—Whyte Hirschboeck Dudek S.C.

(57) ABSTRACT

The present invention is directed to an excited apparatus for coating food product with a coating. The apparatus includes an elongate pan having proximal and distal portions; a screen located in the distal portion and adapted to screen coating; an elongate frame; a motorized vibrator adapted to impart energy to the elongate frame at an angle β below horizontal; a plurality of springs mounting the elongate pan to the elongate frame, the springs being mounted at an angle θ above horizontal; another elongate frame; a plurality of dampeners mounting the two elongate frames; another elongate pan having proximal and distal portions, the elongate pan mounted to the other elongate pan and adapted to feed coating to the other elongate pan; a soft roller rotationally actuated by a ratchet assembly, the ratchet assembly engaged by the elongate pan; and, a recycle assembly for transferring screened coating to the elongate pans, wherein the elongate pan's vibrations have longitudinal and vertical vector components at a predetermined amplitude and frequency. The excited apparatus further includes a waterfall distributor member mounted to the elongate pan, the waterfall distributor including one or more transverse rows of a plurality of angular slots.

34 Claims, 6 Drawing Sheets

U.S. PATENT DOCUMENTS

| | | | |
|---|---|---|---|
| 5,555,967 | A | 9/1996 | Hufford |
| 5,643,361 | A | 7/1997 | Wadell |
| 5,728,216 | A | 3/1998 | London |
| 5,762,176 | A | 6/1998 | Patterson et al. |
| 5,868,241 | A | 2/1999 | Pellegrino |
| 5,908,117 | A | 6/1999 | Stroman et al. |
| 6,000,320 | A | 12/1999 | Herrick, IV |
| 6,019,216 | A | 2/2000 | Patterson |
| 6,079,550 | A | 6/2000 | Gilman |
| 6,079,698 | A | 6/2000 | Patterson et al. |
| 6,117,235 | A | 9/2000 | Toccaceli et al. |
| 6,142,292 | A | 11/2000 | Patterson |
| 6,161,680 | A | 12/2000 | Martin et al. |
| 6,179,117 | B1 | 1/2001 | Gilamn |
| D443,501 | S | 6/2001 | Sleppy |
| 6,250,471 | B1 | 6/2001 | Ruthven et al. |
| 6,253,908 | B1 | 7/2001 | Gilman |
| 6,279,731 | B1 | 8/2001 | Anderson |
| 6,286,658 | B1 | 9/2001 | Hufford |
| 6,308,822 | B1 | 10/2001 | Moran et al. |
| 6,325,202 | B1 | 12/2001 | Gaines |
| 6,415,913 | B2 | 7/2002 | Sleppy et al. |
| 6,457,577 | B1 | 10/2002 | Ikeda et al. |
| 6,460,680 | B1 | 10/2002 | Hufford |
| 6,486,481 | B1 | 11/2002 | Tigera |
| 6,655,523 | B2 | 12/2003 | Jones et al. |
| 6,659,267 | B2 | 12/2003 | Patterson |
| 6,705,459 | B1 | 3/2004 | Musschoot |
| 6,834,756 | B2 | 12/2004 | Sullivan, Jr. |
| 6,868,960 | B2 | 3/2005 | Jones |
| 6,962,128 | B2 | 11/2005 | Dove et al. |
| 2003/0041746 | A1 * | 3/2003 | Schmidt ............ 99/494 |
| 2006/0156931 | A1 | 7/2006 | Mather et al. |

OTHER PUBLICATIONS

Meyer+Garroutte Systems, Brochure, Garroutte Closed Pocket Elevator, "Unique Conveyor Meters Product with No Spilling,"; www.meyer-industries.com.

Marchant Schmidt, Inc. Products>Products Topping Applicators. "Topping Applicator"; http://www.marchantschmidt.com/item_detail.php?id-64.

Stein Associates, Inc., Brochure, "XL Breading Machine" SP-0471-986.

Composiflex, Brochure, "Composite Springs"; www.composiflex.com.

P.J. Prause Durotec GmbH, Brochure, "Fatigue strength of S-PLY leaf springs".

Renold Ajax, Brochure, "Rotart Electric Vibrators".

Volta Belting Technology Ltd., Brochure, "SuperDrive, The Hygienic Positive-Drive Belt", (Sep. 2003).

Intralox, Brochure, "Series 800".

"A composite housing with integrated performance features".

"How to select the right overhung load adaptors".

Flat-Flex, Brochure, "Mesh guide".

Eaton, Brochure, "Low speed high torque motors", Aug. 2006.

Robins Vibro Batter and Breading Machine, Robins Food Processing Machinery, A.K. Robins and Company, Incorporated, p. 230.

\* cited by examiner

VIBRATIONAL EXCITED FRAME FOOD COATING APPARATUS AND METHODS OF USE THEREOF

REFERENCE TO RELATED APPLICATIONS

This application incorporates material included in Disclosure Document No. 555929 filed Jun. 28, 2004, incorporated by reference herein in its entirety. This application further claims priority to U.S. Provisional Patent Application No. 60/667,405 filed Apr. 1, 2005.

FIELD OF THE INVENTION

The field of invention includes food coating and conveying equipment.

BACKGROUND OF THE INVENTION

Prepared food products come in a wide variety of styles. Many prepared food products, whether ready-to-eat or those needing further cooking, are prepared with a coating that makes the food product more appealing. Such prepared food products include entrees, appetizers, deserts (such as donuts), etc., and includes both meats and vegetables. The types of coatings used on these food products include dry coatings such as flour, bread crumbs, corn meal and the like. While the automation of the food coating process is economically desirable, another goal of the food coating process is to make the coating appear to be "home-made." However, most automatic food coating processes fail to make "home-style" appearing foods.

In the commercial production of prepared foods, a large variety of food products are machine-coated with breading, flour or the like before being fried (or otherwise cooked) and packaged. In the food preparation industry, food coatings are generally classified by appearance as flour breading, free flowing (such as cracker meal or bread crumbs), and Japanese-style crumbs which tend to be elongate and crispy. Food coatings may also include seasonings, spices, shortening, etc., as needed to add flavor and texture to the food product. Other coatings such as ground cereal, dried vegetables or the like may also be employed.

Each coating mixture has inherent characteristics that presents challenges to machinery used to automatically and mechanically coat food products. For example, flour mixtures, which consist of finely ground dust-like particles, have a tendency to pack under pressure thereby decreasing the free-flow properties of the coating mixture around the food product, which can decrease coating uniformity. Similarly, coating mixtures recognized as free-flowing include reasonably hard and roughly spherical particles ranging in size from dust to larger particles, such as cornmeal, cracker meal or the like. Free-flowing mixtures in automated coating processes can often flow or leak out of the machinery.

Japanese-style crumbs have no uniform shape, are very delicate, and are crystalline-like in nature and appearance. So, the coating machine should be able to properly handle this type of breading material to avoid degradation of the quality and particle sizes thereof. Japanese-style crumbs consist of modified wheat flour with small percentages of yeast, salt, sugar, vegetable oil and other additives. The Japanese style crumbs appear to be dried shredded white bread having particles ranging in size from as large as ½ inch to as small as flour size particles.

Generally, the food industry prefers to use an automated and continuous food coating process wherever possible while still achieving a "home-style" look. Continuous processes include: tumble drums and mesh belt processes. The tumble drum operation has a hollow drum or tumbling device that is fed with a coating mixture and food products, and it is rotated so that the food product is tumbled in the coating in a manner which causes the coating material to contact and adhere to the outer surfaces of the food. After a sufficient contacting time (generally determined by the size, speed of rotation and internal drum structure) the food items are discharged for further processing.

The drum coating also has its drawbacks. Principally, mechanical handling of the food items may be quite rigorous limiting its use to robust products. More delicate food items (such as fish) may not be suitable for drum processing.

Other types of food coating devices employ endless mesh belts. For example, U.S. Pat. No. 6,117,235 discloses a continuous coating and breading apparatus which includes a conveyor belt made of stainless steel mesh. The conveyor has various stations along its length. Food items are deposited on the belt at an infeed area and are coated with the coating mixture on the bottom surface. The conveyor belt carries the food items under a "waterfall" of food coating that covers the top surface of the food items. The conveyor passes under one or more pressure rolls that pat the coating mixture onto the food pieces. The coated food product is deposited at a discharge area. In commercial practice, such systems may employ as many as six conveying belts to spread the coating mixture and achieve acceptable consistent operation and performance.

Endless belt conveyors also require a number of rollers, guides and motors for multiple belt apparatus. Steel wires (from which the belts are fabricated) are subject to breakage presenting the risk of contaminating the product. Belt breakage can cause steel fines to be present in the coating mix and the final product. Breakage also causes down-time to repair or replace belts. In addition, other moving parts of the conveyor (including the rollers, guides and motors) are also subject to maintenance and repair, necessitating further down-time.

A breading machine was available from A. K. Robins and Company, Baltimore, Md. The machine was marketed as the Robins Vibro Batter and Breading Machine. As shown in FIGS. 1546-5 of the product literature, the vibrator was mounted directly to the coating pan. The coating pan was mounted to a frame using springs. The frame was mounted to the floor and was operated at a very high amplitude and low frequency.

The present invention overcomes the disadvantages associated with the prior machines by providing an excited frame and pan assembly capable of dramatically improved coating of a wide range of food items at relatively high frequency and low amplitude.

SUMMARY OF THE INVENTION

One aspect of the invention is an excited frame apparatus for coating food product with a coating comprising: a first elongate frame, a first elongate pan having first proximal and distal portions, the first elongate pan mounted to the first elongate frame, a plurality of springs adapted to mount the first elongate pan to the first elongate frame, the springs mounted at an angle $\theta$ above horizontal, and, a motorized vibrator mounted and adapted to impart energy to the first elongate frame at an angle $\beta$ below horizontal, wherein the first and second elongate pans are adapted to vibrate having longitudinal and vertical vector components at a predetermined amplitude and frequency, and, wherein the first elongate frame is adapted to operate in a tuned and excited mode.

In another exemplary embodiment, the apparatus may further comprise: a second elongate pan having second proximal and distal portions, the second elongate pan mounted to the first elongate pan and adapted to feed coating to the first elongate pan, and, a waterfall distributor member mounted to the second elongate pan, the waterfall distributor including one or more transverse rows of a plurality of angular slots.

In another exemplary embodiment, the apparatus may further comprise: a screen located in the first distal portion and adapted to screen coating, a second elongate frame, a plurality of dampeners adapted to mount the first elongate frame to the second elongate frame, a soft roller adapted to be rotationally actuated by one or more ratchet assemblies, the ratchet assembly adapted to be engaged by the first elongate pan, a transverse blower assembly adapted to blow at least a portion of loose coating from the top of coated food product into the screen, and, a recycle assembly adapted to transfer screened coating to the first and second elongate pans, wherein the first and second elongate pans are adapted to vibrate having longitudinal and vertical vector components at a predetermined amplitude and frequency.

In another exemplary embodiment, the recycle assembly may include: a funnel adapted to receive the screened coating, a first hopper having a plurality of adjustable vents adapted to variably distribute coating to the first and second elongate pans, and having an agitator assembly adapted to agitate coating in the hopper, and, a drag chain conveyor subassembly adapted to receive the funneled coating and convey the coating to the first hopper.

In another exemplary embodiment, the drag chain conveyor subassembly may comprise: a continuous loop channel, a continuous, flexible band having a plurality of baffles disposed thereon, a plurality of rotors adapted actuate the band through the channel, and, a motor adapted to engage one of the rotors.

In another exemplary embodiment, the apparatus may further comprise: a first distribution means adapted to distribute coating transversely in the proximal portion of the first elongate pan, a second distribution means adapted to distribute coating transversely in the proximal portion of the second elongate pan, and, a third distribution means adapted to receive coating discharged from the second elongate pan and to distribute coating transversely in the proximal portion of the first elongate pan.

In another embodiment of the invention, the frequency may be 20-40% of a natural frequency of the apparatus. The frequency may also be approximately 33% of the natural frequency of the apparatus.

In another embodiment of the invention, the first proximal portion may be longitudinally-inclined below the x-axis at an angle in the range of 2° to 5°. The first proximal portion may also be longitudinally-inclined below the x-axis at an angle of approximately 3°. The first distal portion may be longitudinally-inclined above the x-axis at an angle in the range of 2° to 7°. The first distal portion may also be longitudinally-inclined above the x-axis at an angle of approximately 5°.

In another embodiment of the invention, the apparatus may further comprise a second hopper adapted to feed coating to the continuous loop channel.

In another embodiment of the invention, the motorized vibrator may include 4 identical eccentric weights. The motorized vibrator may include a motor capable of generating 0.75-2 hp. Alternatively, the motorized vibrator may include a motor capable of generating around 1 hp. The motorized vibrator may be adapted to operate at a speed of 800-1200 rpm and vibrate the first elongate pan and first elongate frame at a frequency in the range of approximately 13.3 Hz. to 20 Hz. Alternatively, the motorized vibrator may be adapted to operate at a speed of 900-1000 rpm and vibrate the first elongate pan and first elongate frame at a frequency of approximately 15 Hz. to 16.7 Hz. The motorized vibrator may also be adapted to vibrate the first elongate pan and first elongate frame at an amplitude of around ⅛ to ½ inch. Alternatively, the motorized vibrator may be adapted to vibrate the first elongate pan and first elongate frame at an amplitude of around ⅜ inch.

In another embodiment of the invention, each spring in the apparatus may be a leaf or beam spring. The plurality of springs may also be configured in a plurality of spring assemblies each comprising 2 leaf springs. The plurality of spring assemblies may be in spaced-apart relation longitudinally. The apparatus may include at least 4 spring assemblies. The plurality of spring assemblies may be in parallelepiped orientation, and θ may be in the range of 9° to 35°, wherein β is 90°-θ. Each spring may also have a substantially equal spring constant. θ may also be in the range of 15° to 25°. θ may also be around 22.5°. The spring constant may be in the range of 50-500 lbs/inch. The spring constant may also be in the range of 200-350 lbs/inch. The spring constant may also be about 280 lbs/inch. The apparatus may comprise 36 springs and 18 spring assemblies. The springs may be constructed from a fiberglass-reinforced material selected from the group consisting of polyester and epoxy, and wherein the fiberglass is around 80% unidirectional.

In another embodiment of the invention, the apparatus may comprise two ratchet assemblies each comprising an actuable L-shaped bracket and a ratchet, wherein the ratchet assembly is engaged and the soft roller is rotationally actuated by the vibrations of the first elongate pan.

In another embodiment, the first and second elongate pans may be constructed from a material suitable for contacting food and coating, such as 304 stainless steel. The first and second elongate pans may also be constructed from 316 stainless steel.

In another embodiment, the plurality of dampeners may be constructed from polyurethane tubing having a Durometer in the range of 40-90.

In another embodiment, the continuous, flexible band and plurality of baffles disposed thereon may be constructed from a material selected from the group consisting of polypropylene, a polyethylene, a polyacetal, a nylon, a detectable polypropylene and combinations thereof.

In another embodiment, the second elongate frame may include 4 or more casters mounted thereon.

In another embodiment, the first elongate pan may be of dimensions suitable for use in a food processing facility. For example, the first elongate pan may have a length in the range of 6-10 feet and a width in the range of 14-72 inches. Alternatively, the width may be around 34-40 inches.

In another embodiment, the apparatus may be capable of conveying coating and food product at linear speed in the range of 15-50 feet/minute.

Another aspect of the invention is a method of coating a food product with a coating comprising the steps of: contacting a food product and a coating, and, vibrating the food product and coating for a predetermined duration at a frequency of approximately 13.3 Hz to 20 Hz producing coated food product and coating. Alternatively, the frequency is approximately 15 Hz to 16.7 Hz. Alternatively, the amplitude of the frequency is around ⅛ to ½ inch. The amplitude of the frequency may also be around ⅜ inch.

In another embodiment, the method may further comprise the step of screening the coating from the coated food product.

In another embodiment, the method may further comprise the step of recycling the screened coating to contact a food product.

In another embodiment, the food product may be a member selected from the group consisting of fish, chicken, beef, pork, vegetables, fruit, bakery and confectionaries.

In another embodiment, the coating may be substantially solid, free-flowing, and suitable for consumption. The coating may be a member selected from the group consisting of flour, bread crumbs, cracker meal, cornmeal, spices, coconut, chopped nuts, seeds, sugar, shortening, ground cereal, dried vegetables and mixtures thereof. Alternatively, the coating comprises modified wheat flour, yeast, salt, sugar and vegetable oil.

These and other features and advantages of various exemplary embodiments of the continuous food coating apparatus and methods according to this invention are described in, or are apparent from, the following detailed description of various exemplary embodiments of the apparatus and methods according to this invention.

BRIEF DESCRIPTION OF DRAWINGS OF THE PREFERRED EMBODIMENTS

DETAILED DESCRIPTION OF THE PREFERRED EMBODIMENTS

Figure 1:
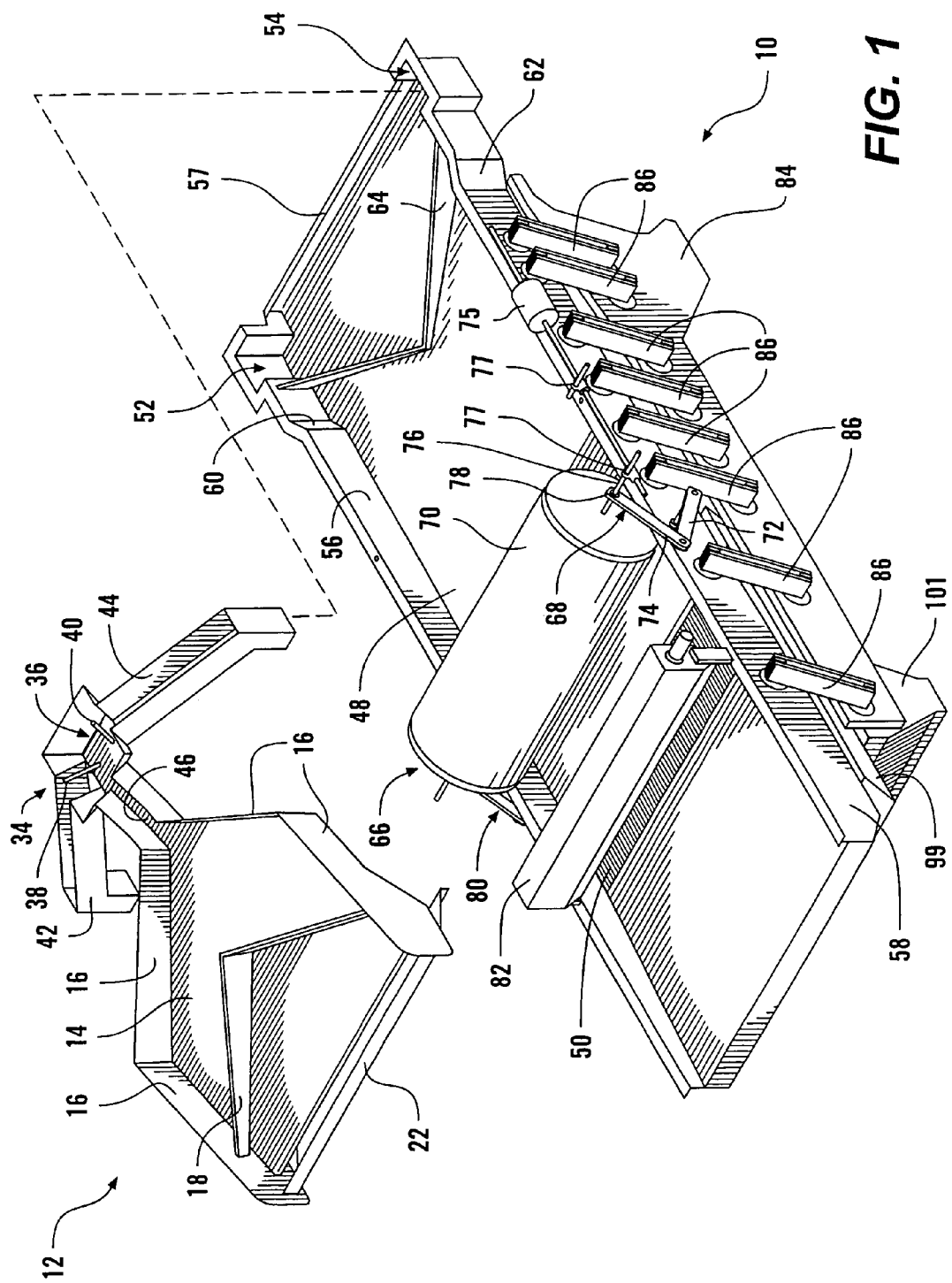
FIG. 1 is a perspective view of an exemplary embodiment of the instant invention including an excited frame assembly and an upper elongate pan assembly.

As shown in FIG. 1, a preferred embodiment of the invention includes an excited frame assembly 10 and an upper elongate pan assembly 12. The upper elongate pan assembly is mounted to the excited frame assembly 10.

The upper elongate pan assembly 12 includes an upper pan 14 having sidewalls 16 to contain a coating, such as free-flowing aggregate breading. The assembly 12 further includes an upper transverse distribution means 18 preferably a tapered, angular, wall-like structure to facilitate distribution (i.e., transversely) of coating across the distal portion of the upper pan 14.

Figure 2:
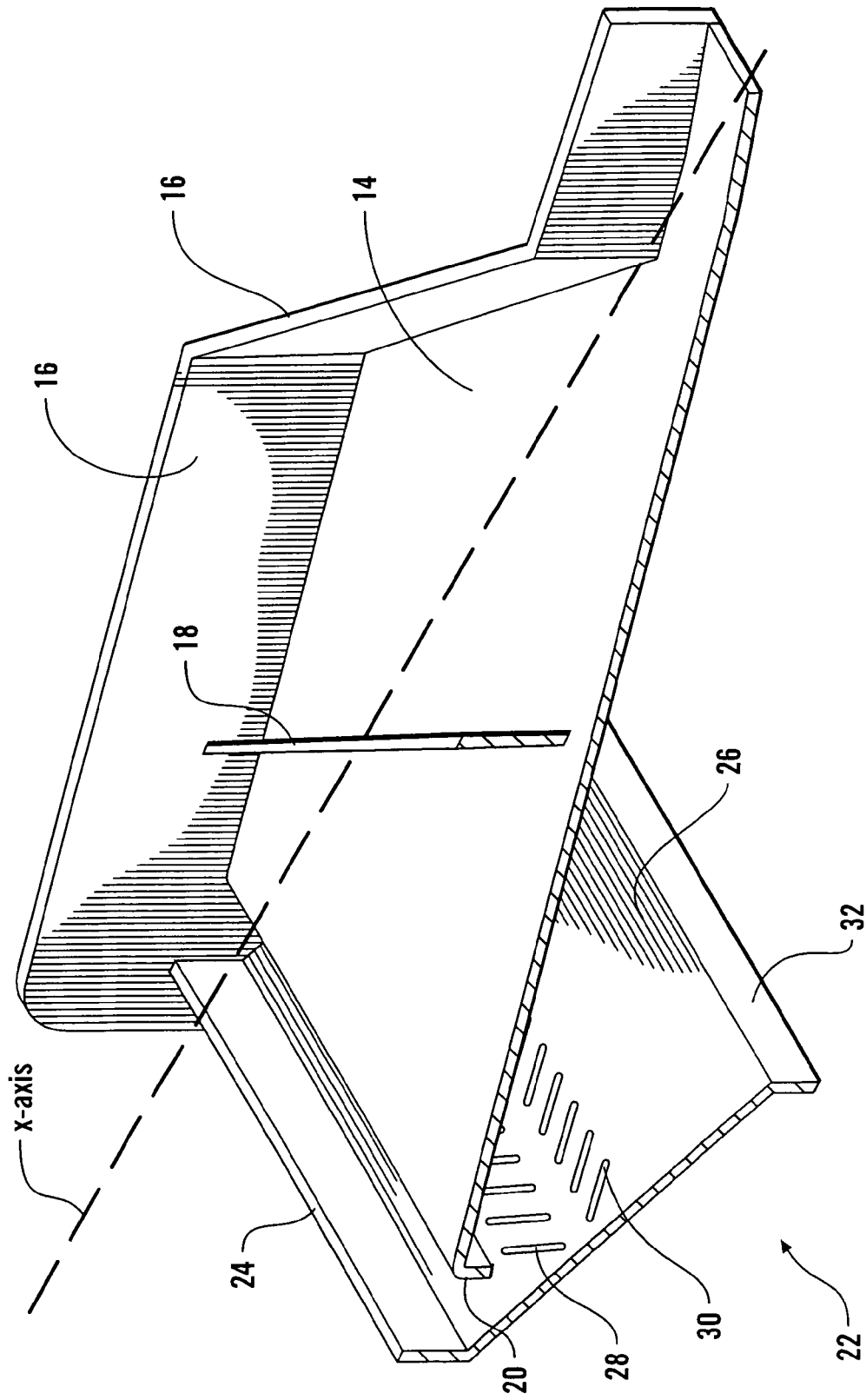
FIG. 2 is a cut-way perspective view of a portion of an exemplary upper elongate pan assembly.

As shown in FIG. 2, a lip 20 is located at the distal end of the pan 14 to facilitate transfer of the coating from the upper pan 14 to a waterfall distributor member 22. The waterfall distributor member 22 includes a proximal lip 24 to direct aggregate coating leaving the distal end of the pan 14 toward a distribution surface 26 of the member 22. The distribution portion 26 includes qty. 2 rows of angular slots 28, 30 oriented in opposition to further facilitate transverse distribution of coating aggregate. The slots 28, 30 may be sized to accommodate various or particular free-flowing aggregate coatings.

The member 22 also includes a distal lip 32 to facilitate movement of coating to the excited frame assembly 10.

As shown in FIG. 1, the upper elongate pan assembly 12 further includes a distributor subassembly 34 comprising a distributor 36 for receiving coating. The well 36 includes qty. 2 prongs 38, 40 for breaking up unsuitably large clumps of coating that may form in the distributor 36 due to, for example, ambient moisture. The subassembly 34 further includes qty. 2 channels 42, 44 for transferring coating from the distributor 36 to the excited frame assembly 10. The subassembly 34 still further includes a trough 46 for transferring coating from the distributor 36 to the upper pan 14 surface.

The excited frame assembly 10 includes a lower pan 48 having a screen 50 located in the distal portion of the lower pan 48. A transverse funnel 101 and tray 99 (see also FIGS. 1 and 6) are mounted to the lower pan 48 under the screen 50 to funnel screened coating into a lower length 104 of a drag-chain recycle channel 106. The lower pan 48 further includes qty. 2 sidewalls 56, 58 that further include angled sidewall members 60, 62, and a back wall 57. At the proximal end of the lower pan 48, qty. 2 wells 52, 54 are positioned to accept the distal end of the respective channels 42, 44. A lower transverse distribution means 64, preferably a tapered, angular, wall-like structure, facilitates transverse distribution of coating across the proximal portion of the lower pan 48.

The excited frame assembly 10 further includes a soft roller assembly 66 adapted to be rotationally actuated by qty. 2 opposing ratchet assemblies 68 (opposing assembly 80 partially shown in FIG. 5) in clockwise rotation, which is desirable (as shown) to facilitate longitudinal movement of the coating and food products. The soft roller cylinder 70 is constructed from materials known in the art, and it pats coating applied to the top surface of the food products from the upper elongate pan assembly 12. Each of the opposing ratchet assemblies 68, 80 includes a first bracket 72 rotationally mounted to the sidewall 58 and rotationally mounted to a second bracket 74. The second bracket 74 is rotationally mounted to a shaft 76 which is fixed with respect to the soft roller 70. The shaft 76 is mounted to the side of the channel 108. (See FIG. 5) A ratchet 78 is incorporated in both ratchet assemblies 68, 80 within the mounting between the second bracket 74 and the shaft 76 to provide for clockwise actuation of the soft roller 70. A counter-weight 75 and mounting assembly 77 are provided to facilitate actuation of the ratchet assembly 68, 80.

Preferably, the ratchet 78 is one-way locking steel with needle-roller bearings. Actuation of the ratchet assembly 68 is provided by the vibrational movement of the excited frame 10. Another ratchet assembly 80 (shown partially in FIG. 1) is provided on the other sidewall 56. A transverse blower 82 is mounted to the sidewalls 56, 58 to blow loose coating from the top of coated food product onto the screen 50.

Figure 3:
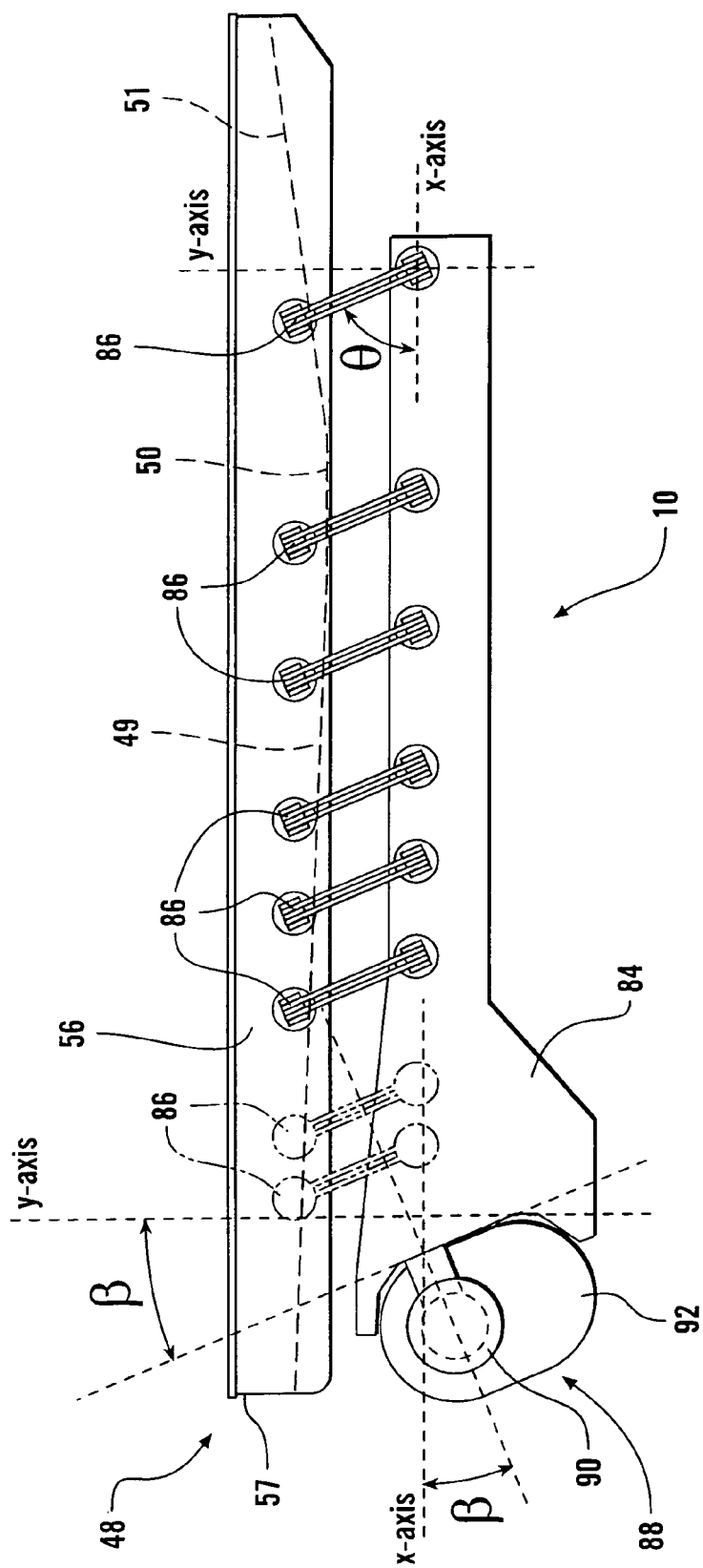
FIG. 3 is a side view of an exemplary excited frame assembly comprising the motorized vibratory assembly, the spring assemblies and the lower pan.

As shown in FIGS. 1 and 3, the excited frame assembly 10 further includes a excited frame 84 mounted to the sidewalls 56,58 of the lower pan 48 by way of a plurality of parallel-epiped arm spring assemblies 86. The lower pan 48 includes a declining bottom 49 between the back wall 57 and the proximal end of the screen 50. Preferably, the bottom 49 is at a decline in the range of 2 to 5 degrees (preferably) 3° below the horizontal x-axis. The lower pan 48 also includes an inclined bottom 51 between the distal end of the screen 50 and distal end of the lower pan 48. Preferably, the bottom 51 is at an incline in the range of 2 to 6 degrees (preferably) 5° above the horizontal x-axis. Preferably, the bottom of the lower pan 48 is declining to facilitate linear movement of the coating material, avoid stalling and avoid the need to operating at excessive frequency and amplitude. The bottom 51 is inclined sufficient to set the distal end of the bottom 51 at the desired height from the ground. Preferably, the screen 50 is horizontally level respecting the x-axis.

In a preferred embodiment shown in FIG. 3, each spring assembly 86 comprises qty. 2 springs. The spring assemblies 86 are oriented at an angle θ above the x-axis. A line of force lies perpendicular to a line through the arm spring assemblies 86. The springs may be constructed from high performance composite materials, such as, but not limited to, E-glass/epoxy, carbon fiberglass/epoxy, (carbon/glass)/epoxy, fiberglass/polyester, and high temperature glass/epoxy in cross-ply, spring orientation and unidirectional (e.g., 80%) pre-preg constructions available from Composiflex, Inc., Erie, PA. Spring design for various excited frame applications is found in product information entitled "Composite Springs" available from Composiflex, Inc.

For example, given a natural frequency ($F_n$ in cycles per minute) and pan mass (m in pounds-mass) (i.e., the total mass of the upper elongate pan assembly 12 and the lower pan 48 and attached components thereof), the sum of all the individual spring constants (ΣK in pounds per inch) is equal to the number of springs (assuming each spring has the same constant) multiplied by $(\pi F_n/30)^2(m/386)$. Thus, the spring constant for each spring is ΣK divided by the number of springs. In an exemplary embodiment, the spring constant is 280 pounds/inch, the width of each spring is around 2½ inches, the length of each spring is around 11 inches and the thickness of each spring is about ¼ inch. In terms of overall design, the spring constant is designed such that the operating frequency is 20-40% of $F_n$, and preferably around 33% $F_n$.

The excited frame assembly 10 further includes a motorized vibrator assembly 88 mounted to the excited frame 84. The motorized vibrator assembly 88 is adapted to impart energy to the excited frame 84 at an angle β below horizontal. In a preferred embodiment, the assembly 88 includes a motor 90 coupled to an eccentric vibrator and housing 92. The eccentric vibrator may be a QE Quadra-Eccentric Vibrator Model QE512-F available from Renold Ajax of Westfield, NY.

Figure 4:
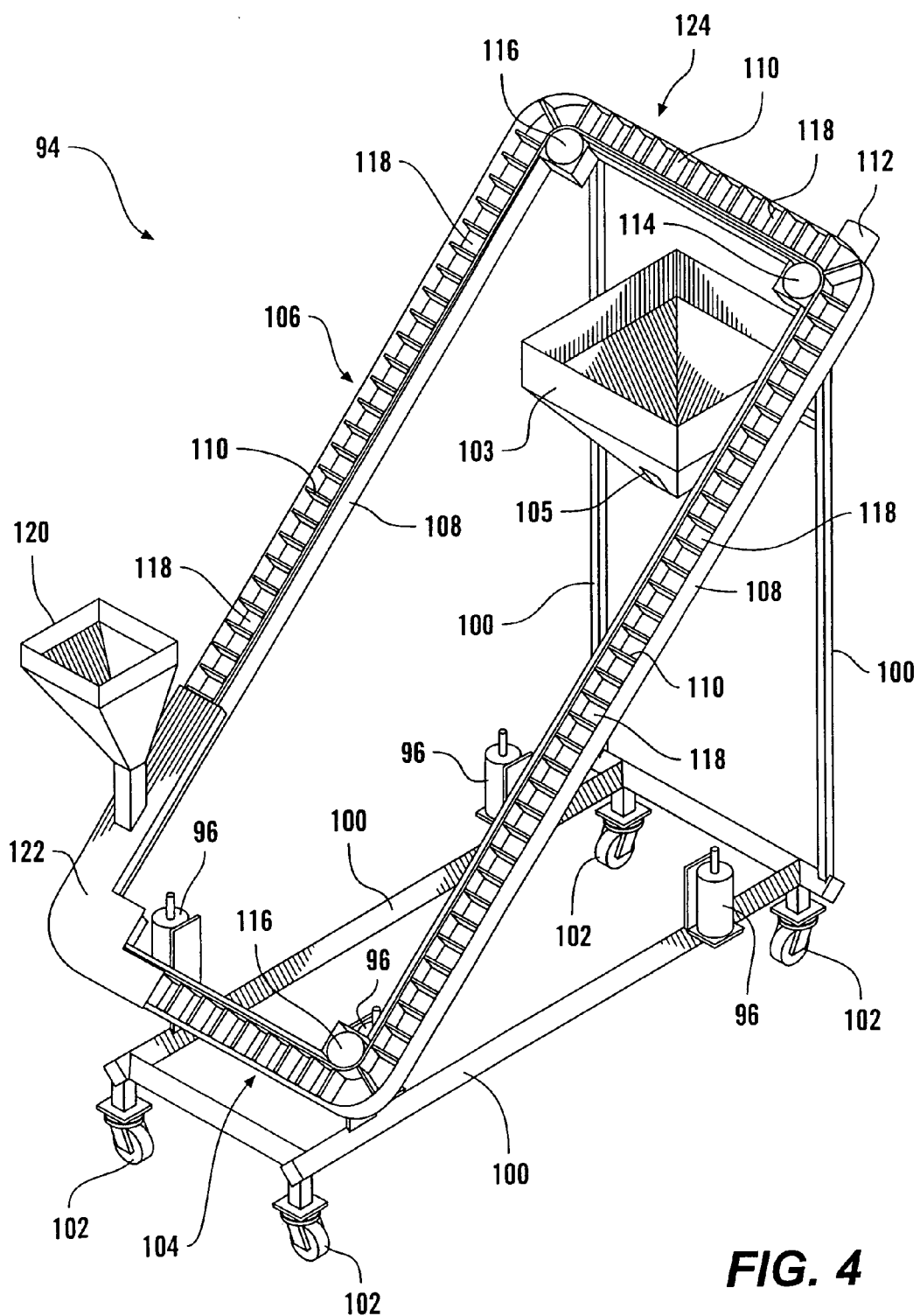
FIG. 4 is a perspective view of an exemplary coating recycle assembly.

Shown in FIG. 4 is an exemplary coating recycle assembly 94 which may be used to recycle coating screened by the screen 50 to the upper elongate pan assembly 12. The recycle assembly 94 is vibrationally-isolated from the excited frame assembly 10 by qty. 4 dampners 96. The excited frame 84 is mounted to the dampners 96 using brackets 98 welded to the excited frame 84. (See FIG. 5) The dampners 96 are bolted to the recycle frame 100. Preferably, the dampner 96 is constructed from a polyurethane tube having a 2.5 inch thick wall, 6 inches in length, and 40-60 Durometer. The dampner 96 is also referred to as an isolator in the art. The recycle frame 100 has qty. 4 shop casters 102 mounted thereon. The casters 102 may also be rail-type casters.

The coating recycle assembly 94 also includes a recycle hopper 103 mounted to the frame 100 and positioned such that recycled coating is funneled into the distributor 36. (See also FIG. 5) The recycle hopper 103 preferably includes adjustable openings 105 to regulate the flow of coating to the channels 42, 44 (not shown) and the trough 46. The drag-chain recycle assembly 106 includes a stainless steel channel 108 structure mounted to the frame 100. A baffled, drag-chain belt 110 is actuated through the channel 108 by a motor-driven 112 rotor 114. Qty. 3 other blank rotors 116 facilitate actuation of the belt 110. The baffles define compartments 118 for handling coating material. An upper length 124 of the channel 108 has an opening (not shown) in the stainless steel channel 108 so that recycled coating falls into the recycle hopper 103.

The drag-chain belt 110 may be constructed from polypropylene, polyethylene, acetal, detectable polypropylene or the like. An exemplary drag-chain belt 110 is a Series 800 Open Hinge Impact Resistant Flight model available from Intralox, LLC of Harahan, LA. A feed hopper 120 mounted to a channel cover 122 is provided to charge or feed coating into the recycle assembly 94.

Figure 5:
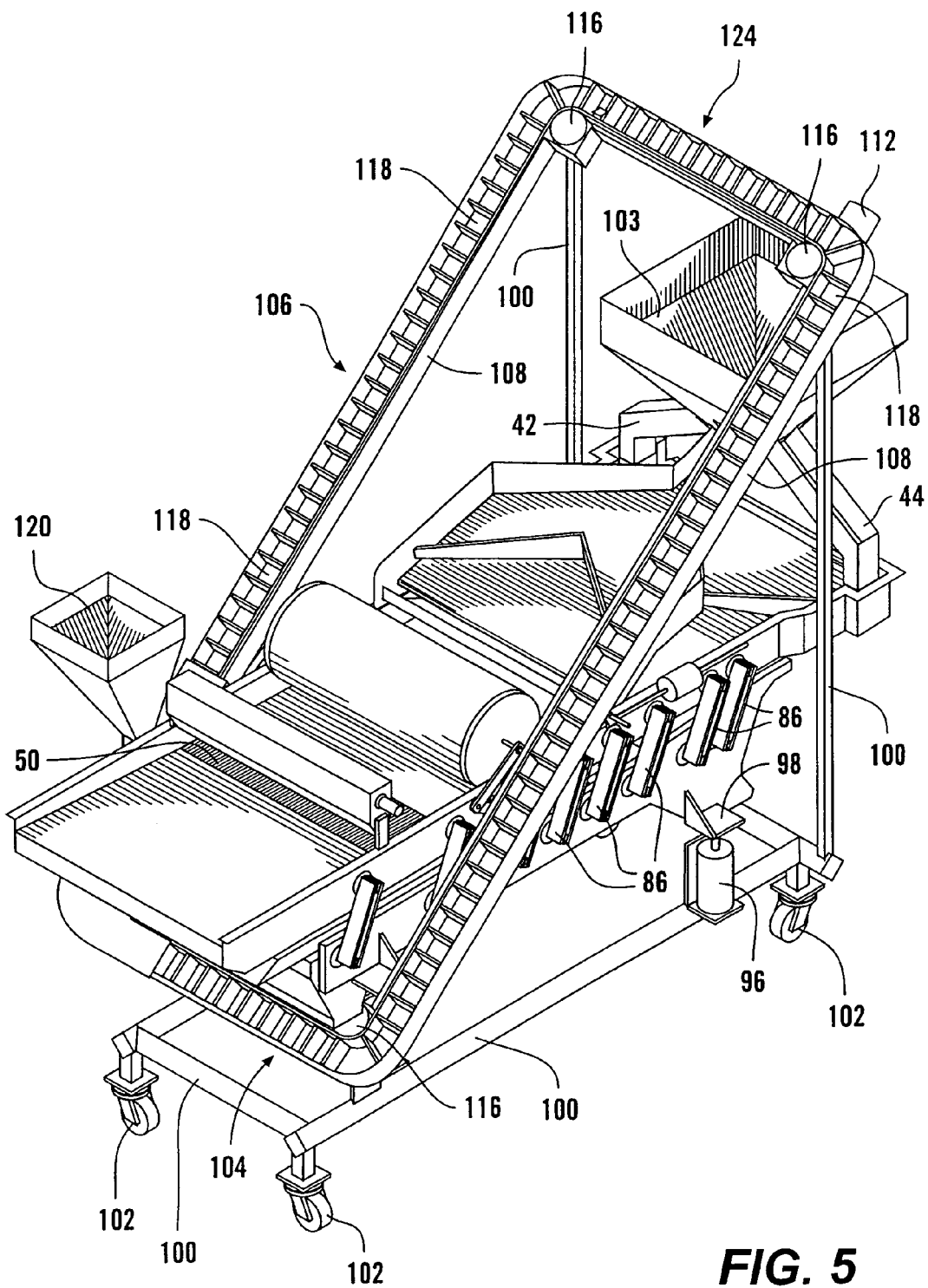
FIG. 5 is a perspective view of an exemplary embodiment of the instant invention including the excited frame assembly, the upper elongate pan assembly and the coating recycle assembly.

Shown in FIG. 5 is an assembled breader apparatus comprising the excited frame assembly 10, the upper elongate pan assembly 12, and the coating recycle assembly 94. The excited frame assembly 10 and upper elongate pan assembly 12 are vibrationally-isolated from the coating recycle assembly 94 by the dampners 96. To begin operation, the motorized vibrator assembly 88 and recycle motor 112 are activated. The speed of the vibrator assembly 88 is adjusted to achieve a predetermined frequency and amplitude. Coating is charged into the feed hopper 120 which is distributed throughout the system. Preferably, food product is fed to the breader apparatus by placing it on a layer of coating in the lower pan 48 downstream from the transverse distribution means 64 and prior to an area where coating falls from the waterfall distributor member 22.

Figure 6:
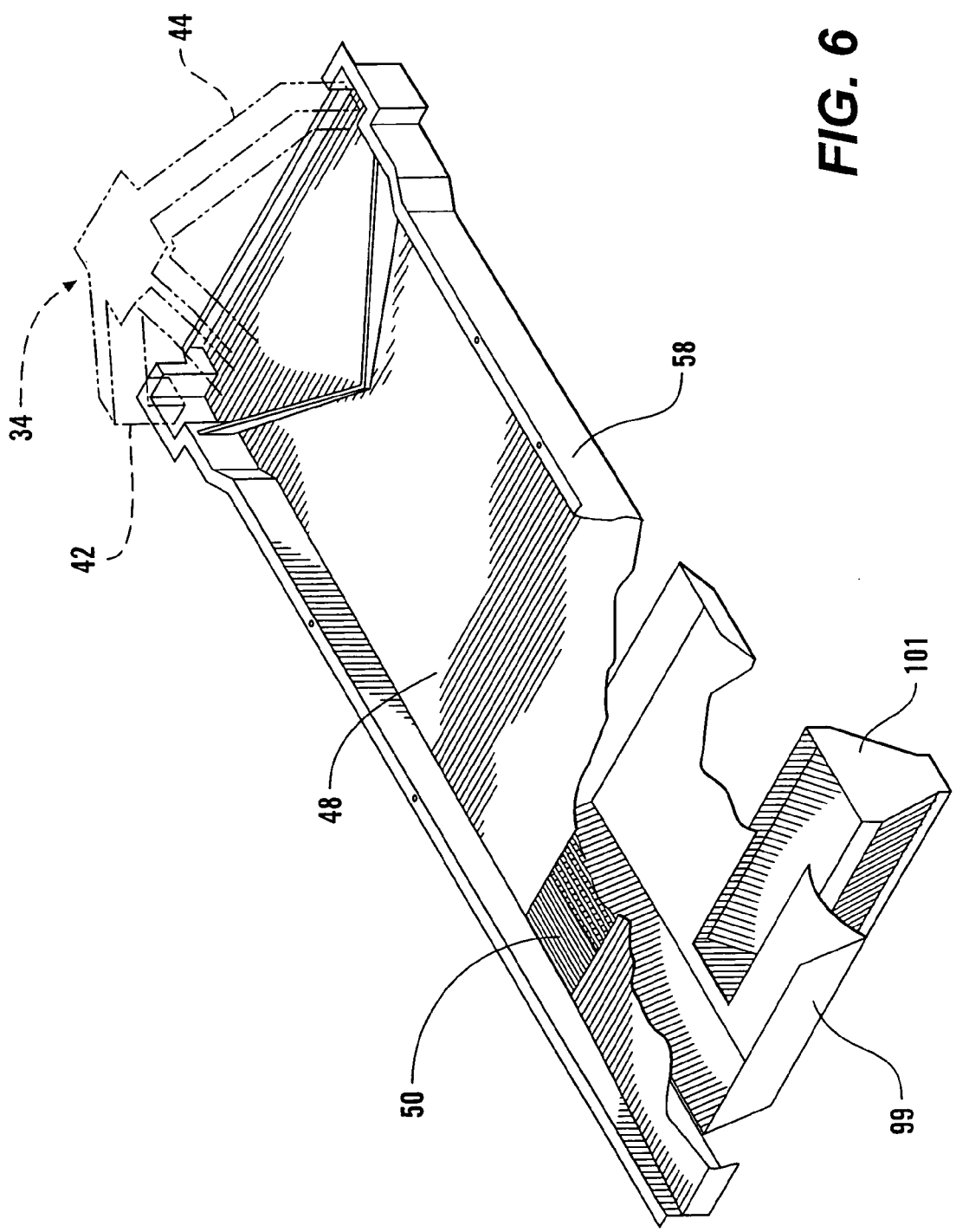
FIG. 6 is a partial cut-away perspective view showing an exemplary transverse funnel and tray assembly for funneling screened coating into the coating recycle assembly.

As shown in FIG. 6, coating screened by the screen 50 falls onto the tray 99 and transverse funnel 101. The tray 99 and transverse funnel 101 are resiliently mounted to the lower pan 48. The tray 99 is preferably tapered down toward the funnel 101 to direct screened coating into the funnel 101. Coating falling from the transverse funnel 101 is directed into the lower length 104 of the drag-chain recycle channel 106.

While this invention has been described in conjunction with the exemplary embodiment outlined above, various alternatives, modifications, variations, improvements, and/or substantial equivalents, whether known or that are or may be presently unforeseen, may become apparent to those having at least an ordinary skill in the art. Accordingly, the exemplary embodiments of the invention as set forth above are intended to be illustrative, not limiting. Various changes may be made without departing from the spirit and scope of the invention. Therefore, the invention is intended to embrace all known or earlier developed alternatives, modifications variations, improvements and/or substantial equivalents.

We claim:

1. An excited frame apparatus for coating food product with a coating comprising:
   a first elongate frame,
   a first elongate pan having first proximal and distal portions, the first elongate pan mounted to the first elongate frame,
   a plurality of springs adapted to mount the first elongate pan to the first elongate frame, the springs mounted at an angle θ above horizontal x-axis, and,
   a motorized vibrator mounted and adapted to impart energy to the first elongate frame at an angle β below horizontal x-axis,
   a second elongate pan adapted to vibrate, having longitudinal and vertical vector components at a predetermined amplitude and frequency, and having second proximal and distal portions, the second elongate pan mounted to the first elongate pan and adapted to feed coating to the first elongate pan,
   a waterfall distributor member mounted to the second elongate pan, the waterfall distributor including one or more transverse rows of a plurality of angular slots, a screen located in the first distal portion and adapted to screen coating, a second elongate frame, a plurality of dampeners adapted to mount the first elongate frame to the second elongate frame, a soft roller adapted to be rotationally actuated by one or more ratchet assemblies, the ratchet assembly adapted to be engaged by the first elongate pan, a transverse blower assembly adapted to blow at least a portion of loose coating from the top of coated food product into the screen, and a recycle assembly adapted to transfer screened coating to the first and second elongate pans, wherein the first elongate frame is adapted to operate in a tuned and excited mode, and wherein the first and second elongate pans are adapted to vibrate having longitudinal and vertical vector components at a predetermined amplitude and frequency.

2. The apparatus of claim 1, wherein the recycle assembly includes:

a funnel adapted to receive the screened coating, a first hopper having a plurality of adjustable vents adapted to variably distribute coating to the first and second elongate pans, and having an agitator assembly adapted to agitate coating in the hopper, and, a drag chain conveyor subassembly adapted to receive the funneled coating and convey the coating to the first hopper, comprising:

a continuous loop channel, a continuous, flexible band having a plurality of baffles disposed thereon, a plurality of rotors adapted actuate the band through the channel, and, a motor adapted to engage one of the rotors.

3. The apparatus of claim 2, further comprising a second hopper adapted to feed coating to the continuous loop channel.

4. The apparatus of claim 2, wherein the continuous, flexible band and plurality of baffles disposed thereon are constructed from a material selected from the group consisting of polypropylene, a polyethylene, a polyacetal, a nylon, a detectable polypropylene and combinations thereof.

5. The apparatus of claim 1, further comprising:

first distribution means adapted to distribute coating transversely in the proximal portion of the first elongate pan, second distribution means adapted to distribute coating transversely in the proximal portion of the second elongate pan, and, third distribution means adapted to receive coating discharged from the second elongate pan and to distribute coating transversely in the proximal portion of the first elongate pan.

6. The apparatus of claim 1, wherein the frequency is 20-40% of a natural frequency of the apparatus.

7. The apparatus of claim 1, wherein the frequency is approximately 33% of the natural frequency of the apparatus.

8. The apparatus of claim 1, wherein the first proximal portion is longitudinally-inclined below the x-axis at an angle in the range of 2° to 5°.

9. The apparatus of claim 1, wherein the first proximal portion is longitudinally-inclined below the x-axis at an angle of approximately 3°.

10. The apparatus of claim 1, wherein the first distal portion is longitudinally-inclined above the x-axis at an angle in the range of 2° to 7°.

11. The apparatus of claim 1, wherein the first distal portion is longitudinally-inclined above the x-axis at an angle of approximately 5°.

12. The apparatus of claim 1, wherein the motorized vibrator includes 4 identical eccentric weights.

13. The apparatus of claim 12, wherein the motorized vibrator includes a motor capable of generating 0.75-2 hp.

14. The apparatus of claim 12, wherein the motorized vibrator includes a motor capable of generating around 1 hp.

15. The apparatus of claim 1, wherein the motorized vibrator is adapted to operate at a speed of 800-1200 rpm and vibrate the first elongate pan and first elongate frame at a frequency in the range of approximately 13.3 Hz. to 20 Hz.

16. The apparatus of claim 1, wherein the motorized vibrator is adapted to operate at a speed of 900-1000 rpm and vibrate the first elongate pan and first elongate frame at a frequency of approximately 15 Hz. to 16.7 Hz.

17. The apparatus of claim 1, wherein the motorized vibrator is adapted to vibrate the first elongate pan and first elongate frame at an amplitude of around ⅛ to ½ inch.

18. The apparatus of claim 1, wherein the motorized vibrator is adapted to vibrate the first elongate pan and first elongate frame at an amplitude of around ¼ inch.

19. The apparatus of claim 1, comprising two ratchet assemblies each comprising an actuable L-shaped bracket and a ratchet, wherein the ratchet assembly is engaged and the soft roller is rotationally actuated by the vibrations of the first elongate pan.

20. The apparatus of claim 1, wherein the first and second elongate pans are constructed from 304 stainless steel.

21. The apparatus of claim 1, wherein the first and second elongate pans are constructed from 316 stainless steel.

22. The apparatus of claim 1, wherein the plurality of dampeners are constructed from polyurethane tubing having a Durometer in the range of 40-90.

23. The apparatus of claim 1, wherein the second elongate frame includes 4 or more casters mounted thereon.

24. The apparatus of claim 1, wherein first elongate pan has a length in the range of 6-10 feet and a width in the range of 14-72 inches.

25. The apparatus of claim 24, wherein the width is around 34-40 inches.

26. The apparatus of claim 24, capable of conveying coating and food product at linear speed in the range of 15-50 feet/minute.

27. An excited frame apparatus for coating food product with a coating comprising:

a first elongate frame, a first elongate pan having first proximal and distal portions, the first elongate pan mounted to the first elongate frame, a plurality of springs adapted to mount the first elongate pan to the first elongate frame, the springs mounted at an angle θ above horizontal, and, a motorized vibrator mounted and adapted to impart energy to the first elongate frame at an angle β below horizontal, wherein the first elongate pan is adapted to vibrate having longitudinal and vertical vector components at a predetermined amplitude and frequency, wherein the first elongate frame is adapted to operate in a tuned and excited mode, wherein each spring is a leaf spring, wherein the plurality of springs are configured in a plurality of spring assemblies each comprising 2 leaf springs, wherein the plurality of spring assemblies are in spaced-apart relation longitudinally, wherein the apparatus includes at least 4 spring assemblies, wherein the plurality of spring assemblies are in parallelepiped orientation, wherein $\theta$ is in the range of 9° to 35°, wherein $\beta$ is 90°-$\theta$, and, wherein each spring has a substantially equal spring constant.

28. The apparatus of claim 27, wherein $\theta$ is in the range of 15° to 25°.

29. The apparatus of claim 27, wherein $\theta$ is around 22.5°.

30. The apparatus of claim 27, wherein the spring constant is in the range of 50-500 lbs/inch.

31. The apparatus of claim 27, wherein the spring constant is in the range of 200-350 lbs/inch.

32. The apparatus of claim 27, wherein the spring constant is about 280 lbs/inch.

33. The apparatus of claim 32, comprising 36 springs and 18 spring assemblies.

34. The apparatus of claim 27, wherein the springs are constructed from a fiberglass-reinforced material selected from the group consisting of polyester and epoxy, and wherein the fiberglass is around 80% unidirectional.

* * * * *